United States Patent
Yang

(10) Patent No.: US 10,628,485 B2
(45) Date of Patent: Apr. 21, 2020

(54) BLOCKCHAIN-BASED MUSIC ORIGINALITY ANALYSIS METHOD AND APPARATUS

(71) Applicant: Alibaba Group Holding Limited, George Town (KY)

(72) Inventor: Xinying Yang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/409,333

(22) Filed: May 10, 2019

(65) Prior Publication Data
US 2019/0347290 A1 Nov. 14, 2019

(30) Foreign Application Priority Data
May 10, 2018 (CN) .......................... 2018 1 0444643

(51) Int. Cl.
*G06F 16/00* (2019.01)
*G06F 16/683* (2019.01)
(Continued)

(52) U.S. Cl.
CPC ........ *G06F 16/683* (2019.01); *G06F 16/1834* (2019.01); *G06F 16/638* (2019.01); *G10H 1/0008* (2013.01); *G10H 2210/061* (2013.01)

(58) Field of Classification Search
CPC .. G06F 16/683; G06F 16/638; G06F 16/1834; G10H 1/0008; G10H 2210/061
(Continued)

(56) References Cited

U.S. PATENT DOCUMENTS 6,591,365 B1 7/2003 Cookson
6,703,918 B1 * 3/2004 Kita .................. G06F 21/32
340/5.52
(Continued)

FOREIGN PATENT DOCUMENTS

CN 102024058 4/2011
CN 103714079 4/2014
(Continued)

OTHER PUBLICATIONS

Crosby et al., "BlockChain Technology: Beyond Bitcon," Sutardja Center for Entrepreneurship & Technology Technical Report, Oct. 16, 2015, 35 pages.
(Continued)

*Primary Examiner* — Thanh-Ha Dang
(74) *Attorney, Agent, or Firm* — Fish & Richardson P.C.

(57) ABSTRACT

This specification describes techniques for blockchain-based music originality analysis. One example method includes retrieving a music file published on a blockchain network comprising the music library node and a music analyzer node, performing an originality analysis on the music file based on a local music library to generate a first originality and analysis digest that indicates an originality and analysis result, publishing the first originality and analysis digest to the blockchain network to record and authenticate the originality and analysis result in the blockchain network, retrieving the first originality and analysis digest published to the blockchain network by the music library nodes, summarizing the first originality and analysis digest to generate a second originality and analysis digest, and processing a service related to originality of the music file based on the second originality and analysis digest.

20 Claims, 9 Drawing Sheets

(51) Int. Cl.
*G06F 16/638* (2019.01)
*G06F 16/182* (2019.01)
*G10H 1/00* (2006.01)

(58) Field of Classification Search
USPC .......................................................... 707/722
See application file for complete search history.

(56) References Cited

U.S. PATENT DOCUMENTS

| | | | |
|---|---|---|---|
| 8,726,379 | B1 | 5/2014 | Stiansen et al. |
| 2003/0196086 | A1* | 10/2003 | Murakami ......... H04N 1/32122 713/161 |
| 2008/0271592 | A1 | 11/2008 | Beckford |
| 2013/0268593 | A1* | 10/2013 | Parekh ................... G06Q 50/01 709/204 |
| 2015/0278820 | A1* | 10/2015 | Meadows ........ G06Q 20/40145 705/64 |
| 2016/0098723 | A1 | 4/2016 | Feeney |
| 2016/0300234 | A1* | 10/2016 | Moss-Pultz ............ G06F 21/10 |
| 2016/0358161 | A1 | 12/2016 | Cobban et al. |
| 2017/0134162 | A1* | 5/2017 | Code ....................... G06F 21/10 |
| 2017/0214522 | A1* | 7/2017 | Code ....................... H04L 9/3247 |
| 2017/0316802 | A1 | 11/2017 | Brock et al. |
| 2018/0041571 | A1* | 2/2018 | Rogers ................... G06F 21/10 |
| 2018/0082290 | A1 | 3/2018 | Allen et al. |
| 2018/0255010 | A1* | 9/2018 | Goyal ..................... H04L 51/12 |
| 2018/0260483 | A1* | 9/2018 | Nagasaka ............. G06F 16/383 |
| 2018/0343110 | A1* | 11/2018 | Funk ..................... H04L 9/0618 |
| 2019/0129895 | A1* | 5/2019 | Middleton ............ H04L 9/0637 |
| 2019/0158274 | A1* | 5/2019 | Tormasov ............. H04L 9/3247 |
| 2019/0199519 | A1* | 6/2019 | Goyal ................... H04L 9/0643 |

FOREIGN PATENT DOCUMENTS

| | | |
|---|---|---|
| CN | 107086920 | 8/2017 |
| CN | 107222303 | 9/2017 |
| CN | 108595709 | 9/2018 |
| CN | 108846776 | 11/2018 |
| IN | 336CHE2014 | 7/2015 |
| JP | 2009042401 | 2/2009 |
| KR | 20140117760 | 10/2014 |
| TW | 201301832 | 1/2013 |
| TW | 201732705 | 9/2017 |
| TW | 201732706 | 9/2017 |
| WO | WO 2016128568 | 8/2016 |

OTHER PUBLICATIONS

Nakamoto, "Bitcoin: A Peer-to-Peer Electronic Cash System," www.bitcoin.org, 2005, 9 pages.

International Search Report and Written Opinion in International Application No. PCT/US2019/031577, dated Jul. 30, 2019, 6 pages.

Ma et al., "The Construction of Digital Copyright Governance System from the Perspective of Block Chain Technology," Mar. 2018, Science Technology and Law, 2(132):1-9 (with English abstract).

* cited by examiner

Key(Corpus account):
"Hello Bob"'s MIDI->rlp->SHA3

Tx(value)content:
Composer: James
Composing time: May 1, 2018
Performer: James as a guitarist/Nick as a pianist
Music style: [pop/rock]
99% tune matched 0X12345678 ("Hey Jude" [pop/rock]);
99% tempo matched 0X12345678 ("Hey Jude" [pop/rock]);
...

FIG. 3

Key(Corpus account):
"Hello Bob"'s MIDI->rlp->SHA3

Tx(value)content:
Composer: James
Composing time: May 1, 2018
Performer: James as a guitarist/Nick as a pianist
Music style: [pop/rock/soul]
Similarity ratio of duration: 60%
99% tune matched 0X12345678 ("Hey Jude" [pop/rock]);
90% tune matched 0X87654321 ("Hello" [pop/soul]);
99% tempo matched 0X12345678 ("Hey Jude" [pop/rock]);
90% tempo matched 0X87654321 ("Hello" [pop/soul]);
...

FIG. 5

BLOCKCHAIN-BASED MUSIC ORIGINALITY ANALYSIS METHOD AND APPARATUS

CROSS-REFERENCE TO RELATED APPLICATIONS

This application claims priority to Chinese Patent Application No. 201810444643.3, filed on May 10, 2018, which is hereby incorporated by reference in its entirety.

TECHNICAL FIELD

The present specification relates to the field of network communications technologies, and in particular, to a blockchain-based music originality analysis method and apparatus.

BACKGROUND

More and more musical works are created with the development of entertainments. Some people attempt to claim copyrights on musical works obtained by simply changing a music name, or slightly changing a music score, or simply joining several existing music scores. Currently, there is still no platform that can be used to perform a similarity analysis on musical works to identify plagiarized or imitated works, and various and complex forms (including pure music, mono-track music, multi-track music, and singing) of musical works make it harder for protecting musical works' copyrights. Simply performing hash coding on the music files for recording and authenticating copyrights cannot verify originality of musical works with similar tunes or tempi but with different forms.

SUMMARY

To alleviate the previous problem, the present specification provides a blockchain-based music originality analysis method, a blockchain network includes at least one analyzer node device and several music library node devices, and the method includes the following: performing, by the music library nodes, the following steps: obtaining a music file published on the blockchain network; performing an originality analysis on the music file based on a local music library to obtain a first originality and analysis digest that is used to indicate an originality and analysis result; and publishing the first originality and analysis digest to the blockchain network to record and authenticate the originality and analysis result at the blockchain network; and performing, by the music analyzer node, the following steps: obtaining the first originality and analysis digest published to the blockchain network by the music library nodes; summarizing the first originality and analysis digests to obtain a second originality and analysis digest; and performing service processing related to originality of the music file based on the second originality and analysis digest.

The present specification further provides a blockchain-based music originality analysis method, a blockchain network includes at least one analyzer node device and several music library node devices, and the method includes the following: obtaining, by the music library nodes, a music file published on the blockchain network; performing an originality analysis on the music file based on a local music library to obtain a first originality and analysis digest that is used to indicate an originality and analysis result; and publishing the first originality and analysis digest to the blockchain network to record and authenticate the originality and analysis result at the blockchain network.

The present specification further provides a blockchain-based music originality analysis method, a blockchain network includes at least one music analyzer node device and several music library node devices, and the method includes the following: obtaining, by the music analyzer node, a first originality and analysis digest published by the music library nodes to the blockchain network, where the first originality and analysis digest indicates an originality and analysis result that is obtained by performing an originality analysis, by the music library nodes and based on a local music library, on a music file obtained from the blockchain network; summarizing the first originality and analysis digests to obtain a second originality and analysis digest; and performing service processing related to originality of the music file based on the second originality and analysis digest.

Correspondingly, a blockchain-based music originality analysis apparatus is provided, a blockchain network includes at least one analyzer node device and several music library node devices, and the apparatus includes the following: an acquisition unit, configured to obtain a music file published on the blockchain network for a music library node; a generation unit, configured to perform an originality analysis on the music file based on a local music library to obtain a first originality and analysis digest that is used to indicate an originality and analysis result; and a recording and authenticating unit, configured to publish the first originality and analysis digest to the blockchain network to record and authenticate the originality and analysis result at the blockchain network.

Correspondingly, the present specification further provides a blockchain-based music originality analysis apparatus, a blockchain network includes at least one music analyzer node device and several music library node devices, and the apparatus includes the following: an acquisition unit, configured to obtain, for the music analyzer node, a first originality and analysis digest published by the music library party to the blockchain network, where the first originality and analysis digest indicates an originality and analysis result that is obtained by performing an originality analysis, by the music library party and based on a local music library, on a music file obtained from the blockchain network; a generation unit, configured to summarize the first originality and analysis digests to obtain a second originality and analysis digest; and a service processing unit, configured to perform service processing related to originality of the music file based on the second originality and analysis digest.

The present specification further provides a computer device, including a memory and a processor, where the memory stores a computer program that can be run by the processor, and when running the computer program, the processor performs steps according to the blockchain-based music originality analysis method performed by the music library party.

The present specification further provides a computer readable storage medium which stores a computer program and when the computer program is run by a processor, steps according to the blockchain-based music originality analysis method performed by the music library party are performed.

The present specification further provides a computer device, including a memory and a processor, where the memory stores a computer program that can be run by the processor, and when running the computer program, the processor performs steps according to the blockchain-based music originality analysis method performed by the music analyzer.

The present specification further provides a computer readable storage medium, which stores a computer program and when the computer program is run by a processor, steps according to the blockchain-based music originality analysis method performed by the music analyzer are performed.

According to the music originality analysis method and apparatus provided in the present specification, the music file is compared with the music in the existing music library from the perspective of tunes, tempi, etc. of the music, so as to obtain the first originality and analysis digest that is used to indicate the originality and analysis result of the music file. Limited by copyright licenses, regions, and styles of a music library, music included in the music library may be insufficient. In the present specification, conclusions obtained by a plurality of existing music libraries are summarized, and the second originality and analysis digest is obtained by comparing the musical work with more existing musical works. As such, a method for identifying whether new musical works plagiarize or imitate existing works is further provided, to record and authenticate copyrights of a music file in a form of music content instead of a digital form of the music file. The music originality analysis methods and apparatuses discussed here are established based on the blockchain technology, and first originality and analysis digests generated by a plurality of music library parties are published to a blockchain distributed ledger, preventing any other parties from pretending as music library institutions, or tampering with content of the first originality and analysis digests, so that a plurality of parties fairly evaluate originality of the music file.

BRIEF DESCRIPTION OF DRAWINGS

FIG. 3 is a schematic diagram illustrating content of a first originality and analysis digest, according to an implementation of the present specification;

FIG. 5 is a schematic diagram illustrating content of a second originality and analysis digest, according to an implementation of the present specification;

DESCRIPTION OF IMPLEMENTATIONS

With the execution of the national intellectual property protection strategy, more and more attention has been paid on the copyright protection of musical works, and it becomes an urgent technical problem for reviewers in the entertainment field to determine whether the emerging "original music" satisfies the originality criteria of a work, or imitates or plagiarizes existing musical works to some extent. Some existing music copyright authentication institutions perform unique coding on a music file, such as performing hash coding, and using the unique coding (or fingerprint) for the copyright related recording and authentication. In such a method, a musical work is processed simply from the perspective of the digital technology instead of content analysis. Because of a unique mapping relationship between the hash code and the original digital text, a music file with content similar to that of the existing music (including the tunes and the beats) but with a different expression form (for example, the existing music contains vocal accompaniment while the music file to be analyzed does not include vocal accompaniment) is considered as a different work from the existing music and can be recorded and authenticated.

The present specification is intended to provide a music originality analysis platform for analyzing originality of music files and recording and authenticating the analysis result. Further, the music originality analysis platform provided in the present specification can also perform service processing such as music recommendation based on the analysis result.

Figure 1:
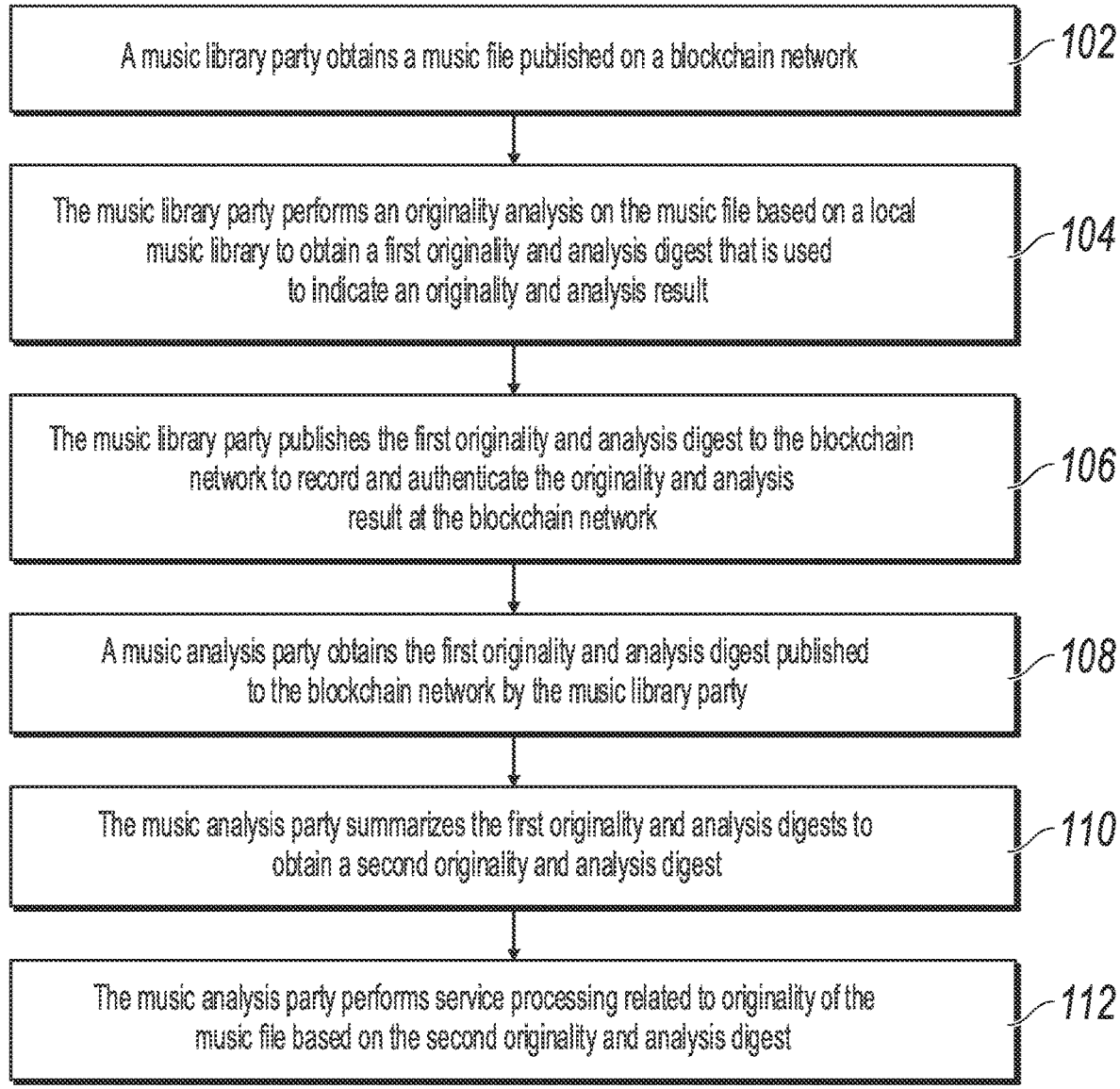
FIG. 1 is a flowchart illustrating a blockchain-based music originality analysis method, according to an implementation of the present specification.

FIG. 1 illustrates an implementation of a blockchain-based music originality analysis method, according to the present specification, and a blockchain network includes node devices corresponding to a plurality of music libraries and node devices corresponding to music analyzers. The method includes the following steps:

Step 102: A music library party obtains a music file from the blockchain network.

Step 104: The music library party performs an originality analysis on the music file included in the blockchain network based on a local music library, to obtain a first originality and analysis digest used to indicate an originality and analysis result.

Step 106: The music library party publishes the first originality and analysis digest to the blockchain network to record and authenticate the originality and analysis result at the blockchain network.

Step 108: A music analyzer obtains the first originality and analysis digest published to the blockchain network by the music library party.

Step 110: The music analyzer summarizes the first originality and analysis digests to obtain a second originality and analysis digest.

Step 112: The music analyzer performs service processing related to originality of the music file based on the second originality and analysis digest.

The "music library party" in the implementations of the present specification means a database server that stores a music file, or a device that is in a data connection to a database for storing a music file, and usually can include a digital music database of a record company, a digital music database of an online music platform, a digital music database of other related companies or entities, or a device that can be in a data connection to the previous database.

The "first originality and analysis digest" in the implementations of the present specification is a similarity degree result obtained after the music library party performs comparison and digital analysis on a music file with originality to be analyzed and an existing music file in a digital music database of the music library party. The similarity degree includes one or more of a tune similarity degree, a beat similarity degree, and a lyric similarity degree (if there are lyrics). The previous originality and analysis result includes the similarity degree, existing music information related to the similarity degree (including a composer, a performer, a music style, etc.), and other indications related to the originality, such as a similarity ratio of duration between the music file and other existing music files. Due to differences in copyright limitations, countries, regions, preferences, etc., existing music files that have been included in different music libraries can overlap with each other or can be different from each other. Therefore, content of a plurality of first originality and analysis digests generated by music libraries can also overlap with each other and can be different from each other.

The "music analyzer" in the implementations of the present specification can be a music original publisher, a music company that wants to purchase a copyright license for a music file to be analyzed, or a service provider that provides a music originality analysis in the present specification such as a music originality analysis platform. The music analyzer is not limited in the method provided in the present specification. The music analyzer summarizes the previous plurality of first originality and analysis digests. The summarizing process includes steps such as removing duplicate content, combining different content, and summarizing the analysis conclusions, to obtain a second originality and analysis digest. In specific service implementation, the previous music analyzer and the previous music library party can be the same institution. However, in the specific implementations provided in the present specification, institutions are divided into music library parties and music analyzers based on steps or functions executed by the institutions (for example, generating a first originality and analysis digest, or generating a second originality and analysis digest).

The "blockchain network" in the implementations provided in the present specification is a P2P network system built by nodes through a consensus mechanism and with a distributed data storage structure. The data in the blockchain network is distributed among "blocks" that are connected to each other in terms of time, and a next block contains a data digest of a current block. Data of all or some of the nodes are fully backed up depending on a specific consensus mechanism (such as POW, POS, DPOS, or PBFT). A person skilled in the art is well aware that, because the blockchain system runs in a corresponding consensus mechanism, data that has been included in the blockchain database is hardly tampered with by any node. For example, for a blockchain network that uses the POW consensus, existing data may be tampered with an attack of at least 51% computing power of the whole network. Therefore, the blockchain system has a feature of ensuring data security and anti-attack and tamper-resistant features superior to those of other centralized database systems.

Implementations provided in the present specification can be run on any device having a computing and storage capability, such as a mobile phone, a tablet computer, a personal computer (PC), a notebook computer, or a server. Functions in the implementations of the present specification can also be implemented by logical nodes running on two or more devices.

In the implementations provided in the present specification, a plurality of music libraries can participate in a blockchain network by agreeing and executing the node service protocol of the blockchain network, and become nodes in the blockchain network. A first originality and analysis digest provided by a music library node device is published on the blockchain network, and can be obtained by any node in the blockchain network. Each music library is openly encouraged to perform an originality analysis based on the principle of fairness. A music file and a first originality and analysis digest that are published to the blockchain network cannot be tampered with by any other node, so as to technically ensure that the first originality and analysis digest is an exact expression of the corresponding music library node.

To clearly authenticate the identity of the data publisher and prevent faked IDs, the data on the blockchain network is usually published together with electronic signatures. The plurality of electronic signatures generated after each music library party electronically signs first originality and analysis digests generated by the music library party are also included in the distributed ledger of the blockchain network. Therefore, before integrating the plurality of first originality and analysis digests into a second originality and analysis digest, the online music platform as a music analyzer needs to obtain electronic signatures of the plurality of first originality and analysis digests from the blockchain network and verify the electronic signatures, and then integrates the first originality and analysis digests obtained after successful signature verification, to generate a second originality and analysis digest. The implementations in the present specification impose no specific limitation on the electronic signature and the signature verification algorithm. The signature verification algorithms can be the elliptic curve cryptography, the RSA algorithm, etc., and the related hash algorithm can be the MD5, the SHA256, etc.

A person skilled in the art should know that data verification or network-wide broadcast verification needs to be performed during collection of a transaction or content data by most existing blockchain ledgers. The data verification process can include verifying an electronic signature of a transaction or content data. However, the previous mechanism cannot exclude a possibility of tampering with a transaction or content by the blockchain ledgers, especially in a blockchain network that skips a network-wide verification mechanism to improve blockchain network running efficiency. The previous implementations provided in the present specification further ensures that the first originality and analysis digest is an exact expression that cannot be tampered with, and the corresponding music library party cannot be pretended by a malicious entity.

In the previous implementation provided in the present specification, a plurality of music libraries compare a music file with the existing music stored locally. The blockchain network provides a unified, authentic, and tamper-resistant platform for publishing comparison conclusions (that is, the first originality and analysis digests) of the plurality of music libraries. The music analyzer can summarize the previous plurality of first originality and analysis digests to obtain an originality analysis conclusion (that is, the second originality and analysis digest) based on more music storage databases. The second originality and analysis digest is closely related to important content factors such as tunes and tempi of music files. Based on the digest, a music file is not considered original simply because of a different expression form (such as pure music or vocal accompaniment), so as to provide reference for evaluating originality of the music file or deciding the next service processing method of the music file.

In a shown implementation of the present specification, usually, a consortium blockchain network architecture can be used to construct the blockchain network so as to reduce the time of confirming the data on the blockchain network, improve the transaction throughput, and satisfy the requirements for security and performance. High reputation institutions, such as the previous music libraries that store existing music data on a large scale, can be used as consortium member nodes of the consortium blockchain network and participate in the accounting of the block. The consensus process of the consortium blockchain network is also controlled by the pre-selected consortium member node. When nodes that exceed a specified ratio (such as 2/3) on the network confirm a block, the transaction or data recorded in the block can be confirmed throughout the network. The consortium blockchain network can decide the openness degree to the public based on an application scenario, and grant access permission to the consortium blockchain network to an institution that can be open to. For example, in the implementations, the music libraries and the previous online music platform used as the music analyzer can participate in accounting as consortium member nodes, and each user who provides the music to be analyzed can be a common node with access permission to the consortium blockchain network.

In a shown implementation of the present specification, the previous plurality of first originality and analysis digests and the second originality and analysis digest are mapped to the music file to improve the convenience of retrieval and the recording and authentication. A unique identification code can be set for the music file, and the unique identification code is added to the content of the first originality and analysis digests and the second originality and analysis digest. Compared with the method for adding the original text of the entire music file to the first originality and analysis digests, the method for adding only the unique identification code to the digest can reduce content of the first originality and analysis digests, and further reduce the space occupied by the first originality and analysis digests on the blockchain network. Different music files shall have different unique identification codes regardless of music files with completely different tunes or music files with the same tune but different expression forms. When uploading a music file to the blockchain network, a provider of the music file (the provider is not limited in the present specification, and can be the music analyzer described in the present specification, or other parties that provide the music file for the blockchain network) can also store the mapping relationship between the music file and the unique identification code in a distributed ledger of the blockchain network to prevent tampering.

There can be a plurality of methods for generating the previous unique identification code. For example, a plurality of labels of the music file are encoded based on a specific coding rule to generate the unique identification code, and a label of the previous music file can include a lyricist, a composer, an instrument performer, a singing performer, composing time, etc. Usually, a combination of a plurality of labels can be encoded to generate a unique code. Preferably, in order to correlate the content of the music file strongly with the unique identification code, the unique identification code can be a hash digest generated based on the music file, and can include a hash digest directly generated from the content of the music file, or a hash digest generated after encoding and performing hash calculation on the music file. Since the hash digest uniquely depends on the content of the music file, the same hash digest is generated for the same music file. Therefore, including the hash digest of the music file in the first originality and analysis digest or the second originality and analysis digest means enabling the hash digest to correspond to the music file in content. When the music file provider establishes the mapping between the music file and the unique identification code, if the same hash digest value is found in the blockchain network, it is not the first time to perform a similarity analysis on the music file on the blockchain network.

In a shown implementation of the present specification, because a music file is usually in an audio format, to further reduce space occupied by a block in a blockchain network, a P2P distributed file system address corresponding to the music file can be published on the blockchain network for recording and authentication, and any node in the blockchain network can access a corresponding file by using the P2P distributed file address such as an IPFS address. The previous P2P distributed file system address is an address based on the file content, and is different from the domain name address. A user searches for the content stored in a place instead of an address. A sender's identity does not need to be verified, and only the hash value of the content needs to be verified. As such, the web page can be faster, safer, more robust, and more durable. Because the P2P distributed file system address related to the content hash digest of the music file has been published on the blockchain network for recording and authentication, any node user in the blockchain network can obtain a corresponding music file based on the address. As such, a block capacity of the blockchain network can be saved, and in addition, tamper-resistant protection can be efficiently performed for the P2P distributed file system address and the music file corresponding to the address.

It is worthwhile to note that the previous process of summarizing the first originality and analysis digests to obtain the second originality and analysis digest can be performed by invoking a smart contract published on the previous blockchain network, to execute an execution program declared in the smart contract and used for summarizing the plurality of first originality and analysis digests, and summarize the plurality of first originality and analysis digests to obtain a second originality and analysis digest. In specific implementation, each music library party can send an instruction including the first originality and analysis digest to an API and an address of the smart contract. The instruction can trigger the previous smart contract to perform summarizing and output a second originality and analysis digest. The music analyzer can also send the instruction that includes the first originality and analysis digest obtained on the blockchain network by the music analyzer to the API and the address of the smart contract. The instruction can trigger the previous smart contract to perform summarizing and output a second originality and analysis digest. The identity of the party that invokes the smart contract is not limited in the present specification, and can be set based on a whitelist predetermined in the smart contract. Compared with the operation mode of summarizing a plurality of first originality and analysis digests by the centralized server of the supervision and analysis party, the smart contract can be invoked at any time at the request of a user to improve the operation efficiency. In addition, the smart contract is executed with less human intervention and advantageous decentralized authority, and fairness of the music originality analysis behavior is further improved.

The following describes an implementation of the blockchain-based music originality analysis method provided in the present specification from the perspective of two execution bodies including the music library party and the music analyzer. It is worthwhile to note that the music library party and the music analyzer can correspond to the same terminal device or different terminal devices.

Figure 2:
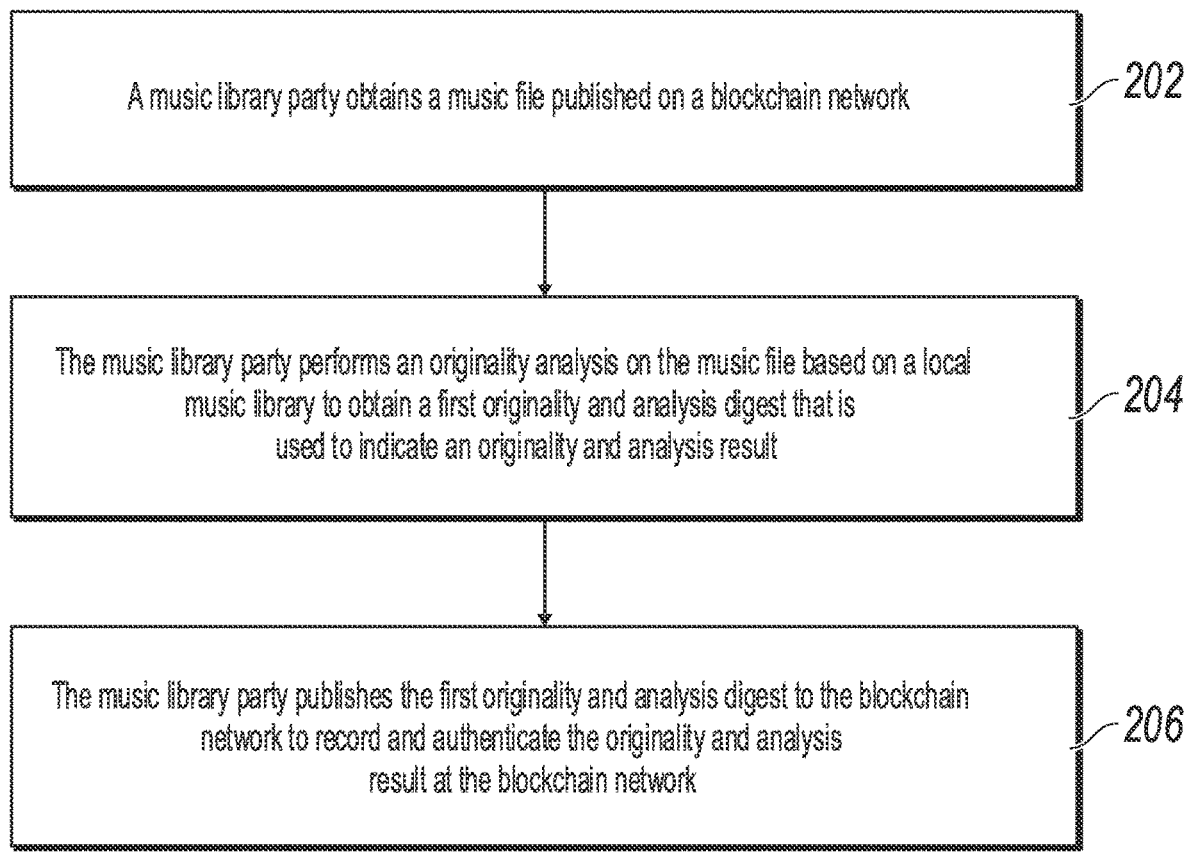
FIG. 2 is a flowchart illustrating a blockchain-based music originality analysis method performed by a music library party, according to an implementation of the present specification.

(1) Implementation of the Music Originality Analysis Method Performed by the Music Library As shown in FIG. 2, the present specification provides an implementation of a blockchain-based music originality analysis method, and a blockchain network includes at least one analyzer node and several music library nodes. The method includes the following steps:

Step 202: The music library node obtains a music file published on the blockchain network.

Step 204: Perform an originality analysis on the music file based on a local music library to obtain a first originality and analysis digest that is used to indicate an originality and analysis result.

Step 206: Publish the first originality and analysis digest to the blockchain network to record and authenticate the originality and analysis result at the blockchain network.

The first originality and analysis digest in the previous implementation is a digest of a similarity degree result based on a comparison between an existing music file in a digital music database of a music library and a music file with originality to be analyzed. The similarity degree result can be obtained by the previously described music library node through a digital analysis. The similarity degree includes one or more of a tune similarity degree, a beat similarity degree, and a lyric similarity degree (if there are lyrics).

FIG. 3 is a schematic diagram illustrating content of a first originality and analysis digest, according to an implementation of the present specification. The unique identification code included in the first originality and analysis digest is a hash digest generated by using the SHA3 algorithm after RLP encoding is performed on a music file, that is, the "Hello Bob" MIDI file. The hash digest can uniquely associate the first originality and analysis digest with the music file. The music library node can retrieve the MIDI music file to obtain a similarity retrieval conclusion through content-based music retrieval (CBMR). The CBMR is a music retrieval form that is based on a physical feature, an auditory feature, and a semantic feature of a music signal. The CBMR includes a query by humming (QBH), a query by tapping (QBT), a query by performance (input by using a MIDI keyboard, etc.), a query by music score (for example, directly entering a musical note sequence), etc. Based on the previous retrieval method and other possible retrieval methods, the music library node can conclude the originality and analysis result in the first originality and analysis digest: a tune similarity degree: 55% tune matched 0X12345678 ("Hey Jude"); a tempo similarity: 55% tempo matched 0X12345678 ("Hey Jude").

In addition, as shown in FIG. 3, the previous first originality and analysis digest can include related information of a music file, such as a composer, composing time, and a performer, and can further include digital representation (for example, MIDI format representation) information, etc.

As described above, the previous music library nodes separately perform an originality analysis on the music file included in the blockchain network based on the existing music stored in the local music library, to obtain the first originality and analysis digest that is used to indicate the originality and analysis result, and publish the first originality and analysis digest on the previous blockchain network. As such, the recording and authenticating process of the music file on the blockchain network is completed. In the existing technology, hash coding or fingerprint is used for recording and authenticating copyrights, and a music file is simply associated with a digital code. In comparison, in the blockchain-based music originality analysis method provided in the present specification, the first originality and analysis digest is closely associated with the most important factors that reflect originality of musical works, such as tunes and tempi (or beats), to authentically evaluate the originality from the perspective of the music content, and the previous originality and analysis result is recorded and authenticated at the blockchain network.

In the previous implementations provided in the present specification, when each music library node uploads the first originality and analysis digest to the blockchain network, to ensure that the first originality and analysis digest made by the music library nodes is not pretended by a malicious entity, the music library node can also upload the digital signature of the device for the first originality and analysis digest to the previous blockchain network. For a specific process, references can be made to the previous implementations, and details are omitted for simplicity.

In a shown implementation, a plurality of first originality and analysis digests include a unique identification code corresponding to the music file. The unique identification code can be a hash digest generated based on the music file. A specific description of the previous implementation is included in the previous implementations, and details are omitted for simplicity.

Based on the previous analysis, the smart contract on the blockchain network can be invoked to execute the process of summarizing the first originality and analysis digests to obtain a second originality and analysis digest. It can be seen from this analysis that, in the implementation provided in the present specification, after obtaining the first originality and analysis digest, the music library party publishes the first originality and analysis digest to the blockchain network. As such, to execute the process of recording and authenticating the originality and analysis result at the blockchain network, the music library party can directly send an instruction message including the first originality and analysis digest to the API and the address of the previous smart contract. In addition, the music library party can summarize the first originality and analysis digests by invoking the smart contract to obtain the second originality and analysis digest. Compared with the way that the centralized server of the music analyzer summarizes the first originality and analysis digests, the running efficiency of the summarizing behavior is improved in the way that the second originality and analysis digest is obtained by using the smart contract published on the blockchain network, because an instruction can be published to the smart contract at any time. In addition, the smart contract is executed with less human intervention and advantageous decentralized authority, and fairness of the music originality analysis behavior is further improved. The implementations of the present specification impose no limitation on the publisher of the smart contract. The smart contract can be agreed by the consortium members of the consortium blockchain network for a music originality analysis and is then published to the blockchain network by an authorized publishing institution, or can be published based on a user's actual analysis needs by the music analyzer such as the music analysis platform provided in the present specification.

(2) Implementation of the Music Originality Analysis Method Performed by the Music Analyzer In the following of the present specification, an online music platform is used as the previous music analyzer to perform a music originality analysis. The following implementations provided in the present specification are described accordingly. The online music platform can be an application layer program established on the blockchain network in the present specification, or a third-party platform program that communicates with and connects to the blockchain node in the present specification.

Figure 4:
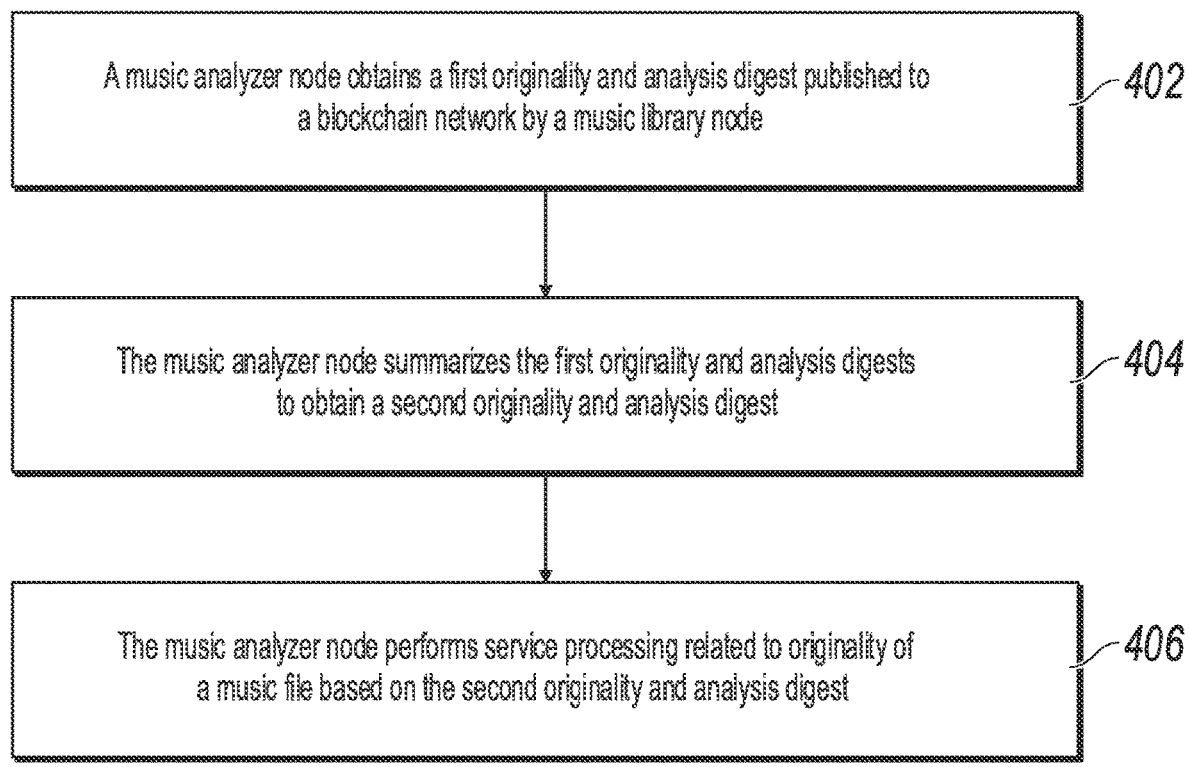
FIG. 4 is a flowchart illustrating a blockchain-based music originality analysis method performed by a music analyzer, according to an implementation of the present specification.

FIG. 4 illustrates an implementation of a blockchain-based music originality analysis method, and a blockchain network includes at least one music analyzer node and several music library nodes. The method includes the following steps:

Step 402: The music analyzer node obtains a first originality and analysis digest published by the music library nodes to the blockchain network, where the first originality and analysis digest indicates an originality and analysis result that is obtained by performing an originality analysis, by the music library node device and based on a local music library, on a music file obtained from the blockchain network.

Step 404: Summarize the first originality and analysis digests to obtain a second originality and analysis digest.

Step 406: Perform service processing related to originality of the music file based on the second originality and analysis digest.

The performing service processing related to originality of the music file can be processing related to a specific service of an online music platform used as a music analyzer. The processing includes sending the second originality and analysis digest to an originality analysis requester of the music file, or recommending music based on content of the second originality and analysis digest, or performing copyright split related to the composers based on content of the second originality and analysis digest.

In the previous implementations provided in the present specification, music libraries can be distributed in music databases all around the world. Due to differences in regions, religious beliefs, preferences, and music files that obtained copyrights, data of an existing musical work or music file included in each music library is different. As such, when the previous music libraries are operating as nodes of the blockchain network to perform a similarity analysis on music files, the music files (for example, "Hey Jude" shown in FIG. 3) used for comparison necessarily have common and different parts, and a corresponding similarity degree result includes overlapping and different content. In addition, there can be up to hundreds of music library nodes on the previous blockchain network depending on specific needs. Users who have music similarity analysis needs cannot easily obtain a specific similarity analysis conclusion with the first originality and analysis digests provided by a plurality of or even hundreds of different music libraries. Therefore, the online music platform as the music analyzer needs to summarize the first originality and analysis digests obtained from the plurality of music libraries. The summarizing includes performing deduplication and combination on the comparison result included in the plurality of first originality and analysis digests and obtained after comparison between the music file and the existing music in the music libraries. As such, a second originality and analysis digest can be generated for the same music file to be analyzed or the unique identification code of the same music file, helping the user with a music similarity analysis need view the content of the originality and analysis digest.

FIG. 5 illustrates content of the second originality and analysis digest obtained after the plurality of first originality and analysis digests shown in FIG. 3 are summarized, including a summarizing result of similarity degrees between the music file "Hello Bob" and the existing music in the plurality of music libraries: music composing time: May 1, 2018; a music style: [pop/rock/soul]; a similarity ratio of duration: 60%; a tune similarity degree: 99% tune matched 0X12345678 ("Hey Jude" [pop/rock]), and 90% tune matched 0X87654321 ("Hello" [pop/soul]); a tempo similarity degree: 99% tempo matched 0X12345678 ("Hey Jude" [pop/rock]), and 90% tempo matched 0X87654321 ("Hello" [pop/soul]).

In the implementations provided in the present specification, a comparison rule of music file similarity can be determined based on a specific need. For example, in the second originality and analysis digest shown in FIG. 5, a similarity degree between the music file "Hello Bob" and the music file "Hey Jude" in tune and tempo dimensions is 99%. That is, "Hello Bob" and "Hey Jude" have similar music segments, and a similarity degree between the similar segments in tune and tempo dimensions is 99%. A similarity degree between the music file "Hello Bob" and the music file "Hello" in tune and tempo dimensions is 90%. That is, "Hello Bob" and "Hello" also have similar music segments, and a similarity degree between the similar segments in tune and tempo dimensions is 90%.

Based on specific demands, the second originality and analysis digest can include how long a music file is similar to a file used for comparison, performer information (including a piano player, violin player, a singing performer, etc.) and performance styles (including pop, classic, etc.) of the music file and the music file used for comparison, etc. With the diversification of modern music creation, it is difficult to determine whether the original music is a plagiarized or imitated result with parameters in a single dimension. Therefore, the second originality and analysis digest needs to contain first originality and analysis digests made by the plurality of music libraries as much as possible, and needs to include more similarity comparison parameters in more dimensions, to obtain more fair conclusions.

In the previous implementations provided in the present specification, when each music library node uploads the first originality and analysis digest to the blockchain network, to ensure that the first originality and analysis digest made by the music library nodes is not pretended by a malicious entity, the music library node can also upload the digital signature of the device for the first originality and analysis digest to the previous blockchain network. Correspondingly, when obtaining the first originality and analysis digests, the music analyzer needs to obtain electronic signatures of the plurality of first originality and analysis digests from the blockchain network and verify the electronic signatures, and then integrates the first originality and analysis digests obtained after successful signature verification, to generate a second originality and analysis digest.

In a shown implementation, a plurality of first originality and analysis digests or the second originality and analysis digest includes a unique identification code corresponding to the music file. The unique identification code can be a hash digest generated based on the music file, or a hash digest generated after the music file is encoded. A specific description of the previous implementation is included in the previous implementations, and details are omitted for simplicity.

Based on the previous analysis, the smart contract on the blockchain network can be invoked to execute the process of summarizing the first originality and analysis digests to obtain a second originality and analysis digest. It can be seen from this analysis that, in the implementation provided in the present specification, after obtaining the first originality and analysis digests from the blockchain network, the music analyzer can perform filtering on the first originality and analysis digests, for example, to determine whether the digital signature verification succeeds or not, or whether a first originality and analysis digest is a first originality cooperation digest provided by the music library of a coordination party of the music analyzer. Then the music analyzer sends an instruction message including the first originality and analysis digest that is successfully filtered to the API and the address of the smart contract, and invokes the smart contract to summarize the first originality and analysis digests to obtain a second originality and analysis digest. Compared with the way that the centralized server of the music analyzer summarizes the first originality and analysis digests, in the way that the second originality and analysis digest is obtained by using the smart contract published on the blockchain network, the smart contract is executed with less human intervention and advantageous decentralized authority due to a transparent execution method of the smart contract on the blockchain network, and the mechanism that most nodes that are ensured by the consensus of the blockchain network successfully verify the execution result improves the fairness of the music originality analysis behavior. Similarly, the implementations of the present specification impose no limitation on the publisher of the smart contract. The smart contract can be agreed by the consortium members of the consortium blockchain network for a music originality analysis and is then published to the blockchain network by an authorized publishing institution, or can be published based on a user's actual analysis needs by the music analyzer such as the music analysis platform provided in the present specification.

Specifically, the following describes the music recommendation based on the content of the second originality and analysis digest in the previous service processing related to music file originality. In the implementations provided in the present specification, after the second originality and analysis digest is obtained, the online music platform used as the music analyzer can perform big data statistics and analysis on the music file by using the second originality and analysis digest, and implement the music recommendation function based on the content of the second originality and analysis digest.

For example, the music platform can recommend music for a user's requirements for music of the same or similar style based on the music style content of the second originality and analysis digest, that is, a user fills a customized template based on the user's preference and requirements, or publishes a work subscription requirement to the previous online music platform. For example, when user A needs works of Bossa Nova and Grunge Rock performance styles and with an originality degree higher than 50%, the music platform can retrieve music files of Bossa Nova and Grunge Rock performance styles and with a similarity degree less than 50% from the previous second originality and analysis digest, and recommend the music files to user A.

For another example, the online music platform can recommend a musical work with an originality degree higher than a predetermined threshold based on the second originality and analysis digest. For example, the online music platform sets a similarity degree of 10% to an originality degree threshold, and a work with a similarity degree lower than 10% is considered as a work with very high originality. To encourage the original work and improve the protection of intellectual property, the work with very high originality can be recommended.

For another example, for an online music platform that provides an online playing function, users' listening or playing behavior data can be collected for analysis, and music is recommended based on content related to content of the second originality and analysis digest in the behavior data. For example, if the online music platform detects that the frequency that user A listens to music of performer B is greater than a predetermined threshold, the music platform recommends the music of performer B included in the content of the second originality and analysis digest to user A. For another example, if the online music platform detects that the frequency that user A listens to classic music is greater than a predetermined threshold, the music platform recommends music files with music styles of classic in the content of the second originality and analysis digest to user A.

Further, the online music platform can also provide association analysis based on the second originality and analysis digest, and perform social recommendation to composers with similar style tendencies and originality talent. For example, the online music platform concludes a second originality and analysis digest that a similarity degree of musical works of composer A is lower than a predetermined threshold (for example, 20%) and musical work styles are country folk. The online music platform also concludes a second originality and analysis digest that a similarity degree of musical works of composer B is lower than a predetermined threshold (for example, 20%) and musical work styles are country folk. The online music platform determines that composer A and composer B are composers with similar style tendencies and originality talent, and can perform social recommendation to composer A and composer B. The recommendation means are not limited to the online music platform, or the contacts information reserved by composer A and composer B on the music platform.

In conclusion, in the previous implementations, the music analyzer summarizes the first originality and analysis digests about music similarity obtained by a plurality of existing music libraries, to further obtain a similarity degree conclusion based on a comparison between the music file and more existing music files, that is, the previous second originality and analysis digest. As such, a method can be provided to identify whether new musical works plagiarize or imitate existing works and perform service processing related to originality. The previous music similarity analysis method is established based on the blockchain technology, and first originality and analysis digests generated by a plurality of music libraries are published to a blockchain distributed ledger, preventing any other nodes from pretending as music library institutions, or tampering with content of the first originality and analysis digests, so that a plurality of parties fairly evaluate originality of the music file.

Figure 8:
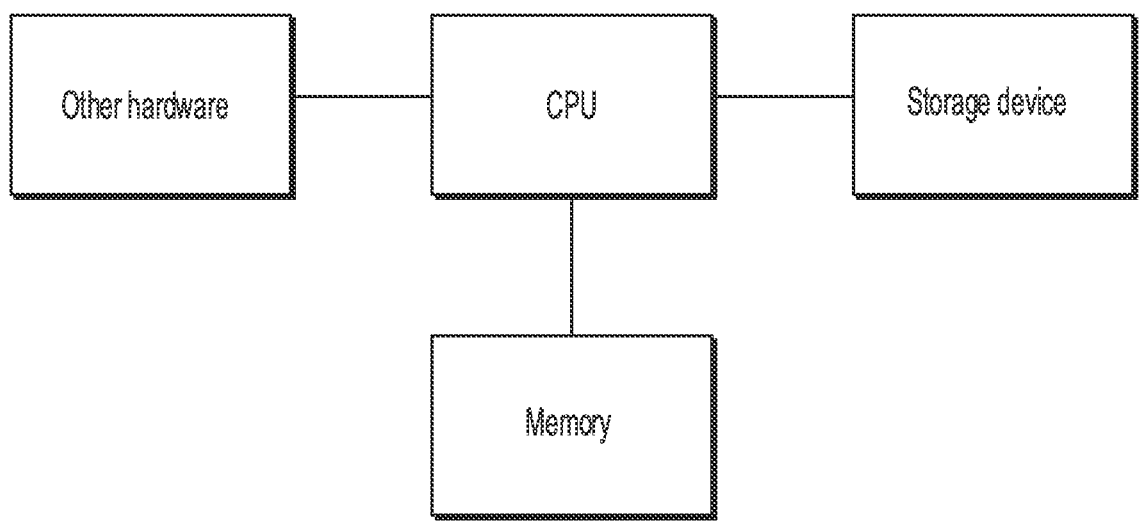
FIG. 8 is a structural diagram illustrating hardware for implementing an implementation of a blockchain-based music originality analysis method or apparatus, according to the present specification.

Corresponding to the earlier described procedure, an implementation of the present specification further provides two blockchain-based music originality analysis apparatuses. The system can be implemented by software, can be implemented by hardware, or can be implemented by a combination of hardware and software. Software implementation is used as an example. As a logical apparatus, the software is formed by reading a corresponding computer program instruction to a memory and running the instruction in the memory by a central processing unit (CPU) in a device that the software is located. In terms of hardware implementation, in addition to the CPU, the memory, and a storage device shown in FIG. 8, the apparatus in which the music originality analysis apparatus is located usually further includes other hardware such as a chip for sending and receiving radio signals, and/or other hardware such as a card configured to implement a network communication function.

Figure 6:
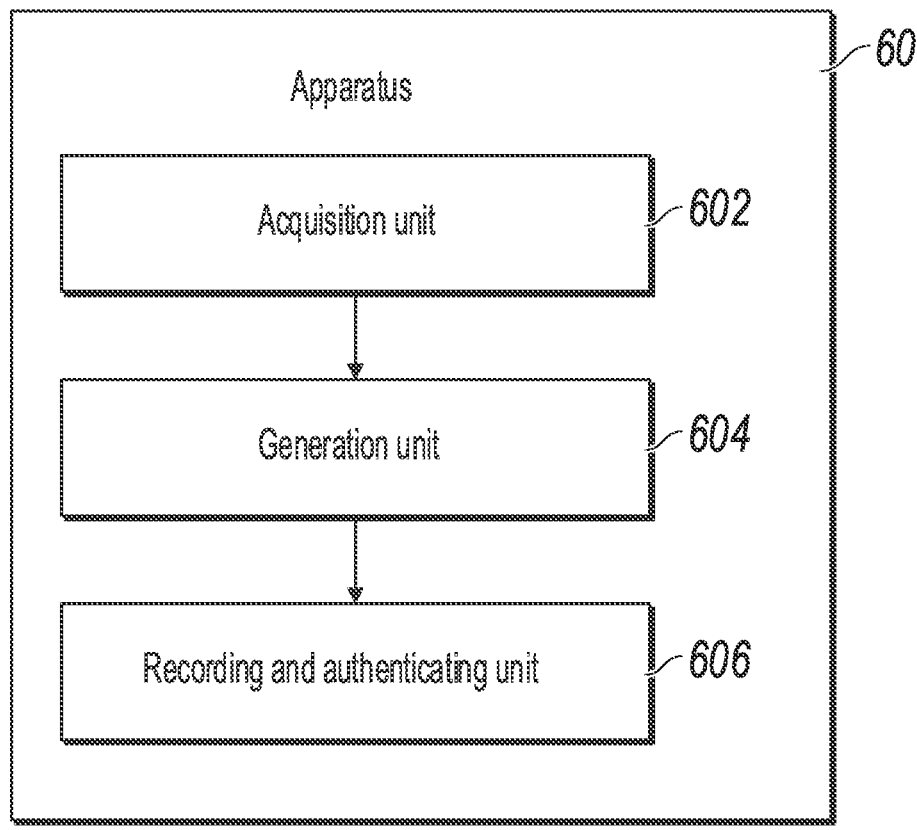
FIG. 6 is a schematic diagram illustrating a blockchain-based music originality analysis apparatus established by a music library party, according to an implementation of the present specification.

FIG. 6 shows a blockchain-based music originality analysis apparatus 60 established by a music library party, according to the present specification. A blockchain network includes node devices corresponding to a plurality of music libraries and node devices corresponding to music analyzers, and the apparatus 60 includes the following: an acquisition unit 602, configured to obtain a music file published on the blockchain network; a generation unit 604, configured to perform an originality analysis on the music file based on a local music library to obtain a first originality and analysis digest that is used to indicate an originality and analysis result; and a recording and authenticating unit 606, configured to publish the first originality and analysis digest to the blockchain network to record and authenticate the originality and analysis result at the blockchain network.

For an implementation process of functions and roles of each unit or module in the system, references can be made to an implementation process of a corresponding step in the previous method. For related parts, references can be made to related descriptions in the method implementation. Details are omitted here for simplicity.

Figure 7:
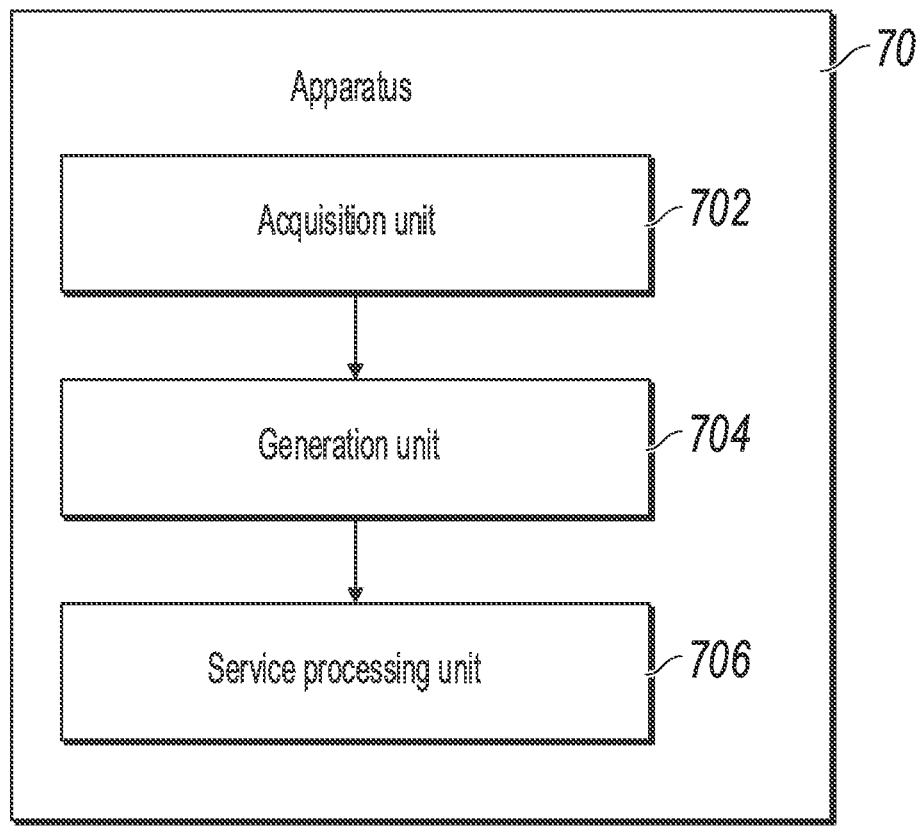
FIG. 7 is a schematic diagram illustrating a blockchain-based music originality analysis apparatus established by a music analyzer, according to an implementation of the present specification.

Similarly, FIG. 7 shows a blockchain-based music originality analysis apparatus 70 established by a music analyzer, according to the present specification. A blockchain network includes node devices corresponding to a plurality of music libraries and node devices corresponding to music analyzers, and the apparatus 70 includes the following: an acquisition unit 702, configured to obtain a first originality and analysis digest published by the music library party to the blockchain network, where the first originality and analysis digest indicates an originality and analysis result that is obtained by performing an originality analysis, by the music library node device and based on a local music library, on a music file obtained from the blockchain network; a generation unit 704, configured to summarize the first originality and analysis digests to obtain a second originality and analysis digest; and a service processing unit 706, configured to perform service processing related to originality of the music file based on the second originality and analysis digest.

The previously described system implementation is merely an example. The units described as separate parts may or may not be physically separate, and parts displayed as units may or may not be physical modules, can be located in one position, or can be distributed on a plurality of network modules. Some or all of the units or modules can be selected based on actual needs to achieve the objectives of the solutions in the present specification. A person of ordinary skill in the art can understand and implement the implementations of the present specification without creative efforts.

The apparatus and units illustrated in the previously described implementations can be implemented by a computer chip or an entity, or can be implemented by a product with a certain function. A typical implementation device is a computer, and the computer can be a personal computer, a laptop computer, a cellular phone, a camera phone, an intelligent phone, a personal digital assistant, a media player, a navigation device, an email receiving and sending device, a game console, a tablet computer, a wearable device, or any combination of these devices.

Corresponding to the previous method implementation, an implementation of the present specification further provides a computer device, where the computer device includes a memory and a processor. The memory stores a computer program that can be run by the processor. When running the stored computer program, the processor performs steps of the blockchain-based music originality analysis method performed by the music library party in the implementations of the present specification. For detailed description of each step of the blockchain-based music originality analysis method, references can be made to the previous content. Details are omitted here for simplicity.

Corresponding to the previous method implementation, an implementation of the present specification further provides a computer device, where the computer device includes a memory and a processor. The memory stores a computer program that can be run by the processor. When running the stored computer program, the processor performs steps of the blockchain-based music originality analysis method performed by the music analyzer in the implementations of the present specification. For detailed description of each step of the blockchain-based music originality analysis method, references can be made to the previous content. Details are omitted here for simplicity.

Corresponding to the previous method implementation, an implementation of the present specification further provides a computer readable storage medium. The computer program stores a storage medium. When running the computer program, a processor performs steps of the blockchain-based music originality analysis method performed by the music library party in the implementations of the present specification. For detailed description of each step of the blockchain-based music originality analysis method, references can be made to the previous content. Details are omitted here for simplicity.

Corresponding to the previous method implementation, an implementation of the present specification further provides a computer readable storage medium. The computer program stores a storage medium. When running the computer program, a processor performs steps of the blockchain-based music originality analysis method performed by the music analyzer in the implementations of the present specification. For detailed description of each step of the blockchain-based music originality analysis method, references can be made to the previous content. Details are omitted here for simplicity.

The previous descriptions are merely preferred implementations of the present specification, but are not intended to limit the present specification. Any modification, equivalent replacement, or improvement made without departing from the spirit and principle of the present specification shall fall within the protection scope of the present specification.

In a typical configuration, a computing device includes one or more processors (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data.

Examples of a computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, or a magnetic tape/magnetic disk storage or another magnetic storage device. The computer storage medium can be used to store information accessible by the computing device. Based on the definition in the present specification, the computer readable medium does not include transitory computer readable media (transitory media) such as a modulated data signal and carrier.

It is worthwhile to further note that, the terms "include", "contain", or their any other variants are intended to cover a non-exclusive inclusion, so a process, a method, a merchandise, or a device that includes a list of elements not only includes those elements but also includes other elements which are not expressly listed, or further includes elements inherent to such a process, a method, a merchandise or a device. Without more constraints, an element preceded by "includes a . . . " does not preclude the existence of additional identical elements in the process, method, merchandise or device that includes the element.

A person skilled in the art should understand that an implementation of the present specification can be provided as a method, a system, or a computer program product. Therefore, the implementations of the present specification can use a form of hardware only implementations, software only implementations, or implementations with a combination of software and hardware. Moreover, the implementations of the present specification can use a form of a computer program product that is implemented on one or more computer-usable storage media (including but not limited to a disk memory, a CD-ROM, an optical memory, etc.) that include computer-usable program code.

Figure 9:
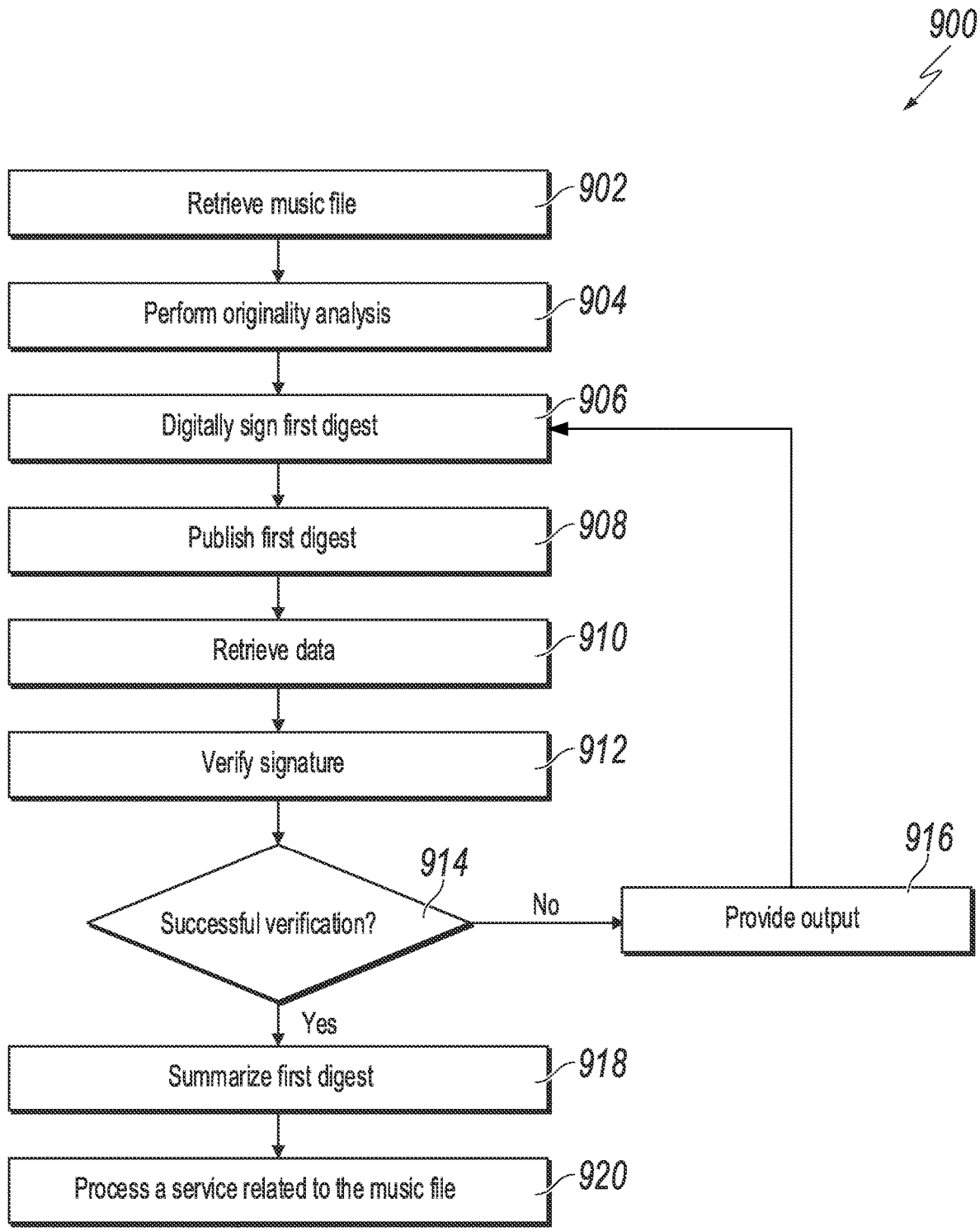
FIG. 9 is a flowchart illustrating an example of a computer-implemented method for blockchain-based music originality analysis, according to an implementation of the present disclosure.

FIG. 9 is a flowchart illustrating an example of a computer-implemented method 900 for blockchain-based music originality analysis, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, a music file that published on a blockchain network is retrieved by a music library node. The blockchain network includes music library nodes and music analyzer nodes. The blockchain network can be a consortium blockchain network. The music library nodes can be a consortium member of the consortium blockchain network. The music file can include one or more of a musical instrument digital interface file, a voiceprint file, a music score file, and a record demo. In some implementations, the music file published is retrieved by retrieving a peer-to-peer (P2P) distributed file system address published on the blockchain network and using the P2P distributed file system address to retrieve the music file. From 902, method 900 proceeds to 904.

At 904, an originality analysis is performed, by the music library nodes, on the music file based on a local music library to generate a first originality and analysis digest. The first originality and analysis digest indicates an originality and analysis result. The first originality and analysis digest can include a unique identification code corresponding to the music file. The unique identification code can include a hash digest generated based on the music file using a related hash algorithm. The related hash algorithms can include message-digest algorithms or secure hash algorithms with digests (hash values) that are 224, 256, 384 or 512 bits. The first originality and analysis digest can include a similarity between the music file and existing music in the local music library. The similarity can include one or more of tune similarity, beat similarity, and lyric similarity. The first originality and analysis digest can include one or more of a composer, composing time, a performer, and a digital representation information of a music score of the music file. From 904, method 900 proceeds to 906.

At 906, the first originality and analysis digest is digitally signed to generate a first originality and analysis digest signature. From 906, method 900 proceeds to 908.

At 908, the first originality and analysis digest is published, by the music library nodes, to the blockchain network to record and authenticate the originality and analysis result in the blockchain network. In some implementations, sending an instruction message includes the first originality and analysis digest to a contract published on the blockchain network. From 908, method 900 proceeds to 910.

At 910, the first originality and analysis digest published to the blockchain network by the music library nodes, is retrieved, by the music analyzer node. In some implementations, in response to retrieving the first originality and analysis digest, the associated contract is invoked. From 910, method 900 proceeds to 912.

At 912, a digital signature verification is performed, by the music analyzer node, on the first originality and analysis digest signature. The signature verification can be based on one or more signature verification algorithms. The signature verification algorithms can include elliptic curve cryptographic (ECC) algorithm, such as Lenstra elliptic-curve factorization or an asymmetric cryptographic algorithm, such as a Rivest-Shamir-Adleman (RSA) algorithm. From 912, method 900 proceeds to 914.

At 914, determination is made, by the music analyzer node, as to whether the digital signature verification succeeds. If it is determined that the digital signature verification does not succeed, method 900 proceeds to 916. At 916, an output is provided to display failure to perform a service based on failed digital signature verification. In some implementations, from 916, process 900 returns to 906.

Otherwise, if it is determined that the digital signature verification succeeds, method 900 proceeds to 918. At 918, in response to determining that the digital signature verification succeeds, the first originality and analysis digests is summarized, by the music analyzer node, to generate a second originality and analysis digest. The second originality and analysis digest can include a unique identification code corresponding to the music file. Summarizing the first originality and analysis digests can include performing deduplication and combination of content of the first originality and analysis digest. From 918, method 900 proceeds to 920.

At 920, a service related to originality of the music file is processed, by the music analyzer node, based on the second originality and analysis digest. After 920, method 900 stops.

Implementations of the present application can solve technical problems in blockchain-based music originality analysis. In some implementations, the blockchain is a distributed storage solution that provides immutable and tamper-resistant data transfer and storage, and the data (e.g., a music file) is stored in a database of the blockchain in an encrypted form. Such security measures ensure that that data stored on the blockchain is not corrupted or altered by malicious processes. For example, an alteration of an originality and analysis digest associated with a music file can be a tactic used by an attacker when a target user is compromised for fraudulent purposes, and storage of data on an immutable blockchain prevents the use of that tactic by an attacker. In some implementations, the blockchain headers from different music library nodes across entities are cross-Merkelized or otherwise processed on the blockchain to further ensure the integrity of music files, music libraries, contracts and originality and analysis digests stored in the database of the blockchain and transferred between nodes of the blockchain.

In consideration of security and confidentiality, contract objects can be configured to perform privacy protection processing on the originality and analysis digests associated with the music file before sending the originality and analysis digests to other nodes for further processing. In addition, the originality and analysis digest transfer operation is configured such that it does not affect the overall data volume within the blockchain by deleting a data volume from a first location when adding the corresponding data volume in a second location. As such, the originality and analysis digest transfer operation does not lead to an exponential increase of data volume, which is a common problem associated with conventional methods of music data management.

Implementations of the present application provide methods and apparatuses for improving blockchain-based music originality analysis. In some implementations, a processing platform (e.g., a music analyzer node) obtains originality and analysis digest with a digital signature that is to be validated and that corresponds to a predetermined feature from a music library node. The implementations in the present specification impose no specific limitation on the electronic signature and the signature verification algorithm. The data verification process can include verifying an electronic signature of a transaction or content data that further ensures that the first originality and analysis digest includes a matching expression that cannot be tampered with, and the corresponding music library party cannot be substituted by a malicious entity.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   retrieving, by a first of a plurality of music library nodes, a music file published on a blockchain network and accessed by a user at a frequency exceeding an accessing threshold, the blockchain network comprising a distributed ledger, the plurality of music library nodes and a music analyzer node;
   performing, by the first of the plurality of music library nodes, an originality analysis on the music file based on a local music library to generate a first originality and analysis digest that indicates an originality and analysis result, the first originality and analysis digest comprising a hash digest generated from a content of the music file;
   publishing, by the first of the plurality of music library nodes, the first originality and analysis digest to the blockchain network to record and authenticate the originality and analysis result in the blockchain network;
   retrieving, by the music analyzer node, the first originality and analysis digest published to the blockchain network;
   processing, by the music analyzer node, the first originality and analysis digest by applying a comparison rule of music file similarity to generate a second originality and analysis digest; and
   providing, by the first of the music analyzer node, a recommendation related to the music file based on the second originality and analysis digest.

2. The computer-implemented method of claim 1, wherein publishing the first originality and analysis digest to the blockchain network comprises:
   digitally signing the first originality and analysis digest to generate a first originality and analysis digest signature; and
   publishing the first originality and analysis digest signature and the first originality and analysis digest to the blockchain network.

3. The computer-implemented method of claim 1, wherein the first originality and analysis digest or the second originality and analysis digest comprise a unique identification code corresponding to the music file.

4. The computer-implemented method of claim 1, wherein the music file comprises one or more of a musical instrument digital interface file, a voiceprint file, a music score file, and a record demo.

5. The computer-implemented method of claim 1, wherein retrieving, by the plurality of music library nodes, the music file published on the blockchain network comprises:
   retrieving, by the plurality of music library nodes, a peer-to-peer distributed file system address published on the blockchain network; and
   retrieving the music file based on the peer-to-peer distributed file system address.

6. The computer-implemented method of claim 1, wherein the first originality and analysis digest comprises a similarity between the music file and existing music in the local music library, and the similarity comprises one or more of tune similarity, beat similarity, and lyric similarity.

7. The computer-implemented method of claim 1, wherein processing the first originality and analysis digest comprises performing deduplication and combination of content of the first originality and analysis digest.

8. A non-transitory, computer-readable medium storing one or more instructions executable by a computer system to perform operations comprising:
   retrieving, by a first of a plurality of music library nodes, a music file published on a blockchain network and accessed by a user at a frequency exceeding an accessing threshold, the blockchain network comprising a distributed ledger, the plurality of music library nodes and a music analyzer node;
   performing, by the first of the plurality of music library nodes, an originality analysis on the music file based on a local music library to generate a first originality and analysis digest that indicates an originality and analysis result, the first originality and analysis digest comprising a hash digest generated from a content of the music file;
   publishing, by the first of the plurality of music library nodes, the first originality and analysis digest to the blockchain network to record and authenticate the originality and analysis result in the blockchain network;
   retrieving, by the music analyzer node, the first originality and analysis digest published to the blockchain network;
   processing, by the music analyzer node, the first originality and analysis digest by applying a comparison rule of music file similarity to generate a second originality and analysis digest; and
   providing, by the first of the music analyzer node, a recommendation related to the music file based on the second originality and analysis digest.

9. The non-transitory, computer-readable medium of claim 8, wherein publishing the first originality and analysis digest to the blockchain network comprises:
   digitally signing the first originality and analysis digest to generate a first originality and analysis digest signature; and
   publishing the first originality and analysis digest signature and the first originality and analysis digest to the blockchain network.

10. The non-transitory, computer-readable medium of claim 8, wherein the first originality and analysis digest or the second originality and analysis digest comprise a unique identification code corresponding to the music file.

11. The non-transitory, computer-readable medium of claim 8, wherein the music file comprises one or more of a musical instrument digital interface file, a voiceprint file, a music score file, and a record demo.

12. The non-transitory, computer-readable medium of claim 8, wherein retrieving, by the plurality of music library nodes, the music file published on the blockchain network comprises:
   retrieving, by the plurality of music library nodes, a peer-to-peer distributed file system address published on the blockchain network; and
   retrieving the music file based on the peer-to-peer distributed file system address.

13. The non-transitory, computer-readable medium of claim 8, wherein the first originality and analysis digest comprises a similarity between the music file and existing music in the local music library, and the similarity comprises one or more of tune similarity, beat similarity, and lyric similarity.

14. The non-transitory, computer-readable medium of claim 8, wherein processing the first originality and analysis digest comprises performing deduplication and combination of content of the first originality and analysis digest.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      retrieving, by a first of a plurality of music library nodes, a music file published on a blockchain network and accessed by a user at a frequency exceeding an accessing threshold, the blockchain network comprising a distributed ledger, the plurality of music library nodes and a music analyzer node;
      performing, by the first of the plurality of music library nodes, an originality analysis on the music file based on a local music library to generate a first originality and analysis digest that indicates an originality and analysis result, the first originality and analysis digest comprising a hash digest generated from a content of the music file;
      publishing, by the first of the plurality of music library nodes, the first originality and analysis digest to the blockchain network to record and authenticate the originality and analysis result in the blockchain network;
      retrieving, by the music analyzer node, the first originality and analysis digest published to the blockchain network;
      processing, by the music analyzer node, the first originality and analysis digest by applying a comparison rule of music file similarity to generate a second originality and analysis digest; and
      providing, by the first of the music analyzer node, a recommendation related to the music file based on the second originality and analysis digest.

16. The computer-implemented system of claim 15, wherein publishing the first originality and analysis digest to the blockchain network comprises:
   digitally signing the first originality and analysis digest to generate a first originality and analysis digest signature; and
   publishing the first originality and analysis digest signature and the first originality and analysis digest to the blockchain network.

17. The computer-implemented system of claim 15, wherein the first originality and analysis digest or the second originality and analysis digest comprise a unique identification code corresponding to the music file.

18. The computer-implemented system of claim 15, wherein the music file comprises one or more of a musical instrument digital interface file, a voiceprint file, a music score file, and a record demo.

19. The computer-implemented system of claim 15, wherein retrieving, by the plurality of music library nodes, the music file published on the blockchain network comprises:
   retrieving, by the plurality of music library nodes, a peer-to-peer distributed file system address published on the blockchain network; and
   retrieving the music file based on the peer-to-peer distributed file system address.

20. The computer-implemented system of claim 15, wherein the first originality and analysis digest comprises a similarity between the music file and existing music in the local music library, and the similarity comprises one or more of tune similarity, beat similarity, and lyric similarity.

\* \* \* \* \*